(12) United States Patent
Rao et al.

(10) Patent No.: US 12,461,519 B2
(45) Date of Patent: Nov. 4, 2025

(54) SYSTEM AND METHOD FOR RETROACTIVE AND AUTOMATED VALIDATION OR CORRECTIVE ACTION WITH RESPECT TO ONLINE SENSORS

(71) Applicant: Buckman Laboratories International, Inc., Memphis, TN (US)

(72) Inventors: Narasimha M. Rao, Collierville, TN (US); Ryan Carli, Cordova, TN (US)

(73) Assignee: Buckman Laboratories International, Inc., Memphis, TN (US)

( * ) Notice: Subject to any disclaimer, the term of this patent is extended or adjusted under 35 U.S.C. 154(b) by 341 days.

(21) Appl. No.: 18/125,513

(22) Filed: Mar. 23, 2023

(65) Prior Publication Data

US 2023/0305552 A1 Sep. 28, 2023

Related U.S. Application Data

(60) Provisional application No. 63/323,138, filed on Mar. 24, 2022.

(51) Int. Cl.
 *G05B 23/02* (2006.01)
(52) U.S. Cl.
 CPC ..... *G05B 23/0283* (2013.01); *G05B 23/0232* (2013.01); *G05B 23/0243* (2013.01); *G05B 23/0267* (2013.01)
(58) Field of Classification Search
 CPC ............ G05B 23/0283; G05B 23/0232; G05B 23/0243; G05B 23/0267; G05B 23/0221
 See application file for complete search history.

(56) References Cited

U.S. PATENT DOCUMENTS 4,978,861 A 12/1990 Sabater et al.
5,269,883 A 12/1993 Beuther
(Continued)

FOREIGN PATENT DOCUMENTS

EP 3293595 A1 3/2018
KR 101992747 B1 6/2019
(Continued)

OTHER PUBLICATIONS

International Search Report and Written Opinion for corresponding patent application No. PCT/US2023/015772, dated Jul. 4, 2023, 10 pages.

*Primary Examiner* — Lee E Rodak
*Assistant Examiner* — Byung Ro Lee
(74) *Attorney, Agent, or Firm* — Patterson Intellectual Property Law, PC

(57) ABSTRACT

A system and method is provided for correction of sensors in an industrial process. A first sensor provides first data corresponding to measured variables for at least one respective process component, which are further aggregated in data storage with corresponding contextual tags comprising time series identifiers. For a given sample from the industrial process, at least the first data having a corresponding time series identifier are obtained for comparison with second data collected via a second sensor and which comprises measured variables corresponding to the at least one respective process component from the given sample. A feedback signal is selectively generated based on a determined error between the collected first data and the collected second data corresponding to the given sample, and may in an embodiment be used for automatically calibrating the first sensor. The feedback signal may further or alternatively be used to prompt interventions in the first sensor.

18 Claims, 2 Drawing Sheets

(56) References Cited

U.S. PATENT DOCUMENTS

| | | |
|---|---|---|
| 5,512,139 A | 4/1996 | Worcester |
| 5,571,382 A | 11/1996 | Berglund |
| 5,635,028 A | 6/1997 | Vinson et al. |
| 5,649,448 A | 7/1997 | Koskimies et al. |
| 5,654,799 A | 8/1997 | Chase et al. |
| 6,485,571 B1 | 11/2002 | Graf |
| 6,523,401 B2 | 2/2003 | Oechsle et al. |
| 6,701,637 B2 | 3/2004 | Lindsay et al. |
| 6,749,723 B2 | 6/2004 | Linden |
| 6,881,583 B2 | 4/2005 | Kahle |
| 7,101,461 B2 | 9/2006 | Allen et al. |
| 7,545,971 B2 | 6/2009 | Shakespeare |
| 7,803,899 B2 | 9/2010 | Zollinger et al. |
| 7,959,763 B2 | 6/2011 | Machattie et al. |
| 8,308,900 B2 | 11/2012 | Covarrubias et al. |
| 8,568,562 B2 | 10/2013 | Sullivan et al. |
| 8,691,323 B2 | 4/2014 | Von Drasek et al. |
| 8,958,898 B2 | 2/2015 | Von Drasek et al. |
| 9,109,330 B2 | 8/2015 | Shakespeare et al. |
| 9,121,136 B2 | 9/2015 | Aengeneyndt et al. |
| 9,182,271 B2 | 11/2015 | Grigoriev et al. |
| 9,238,889 B2 | 1/2016 | Paavola et al. |
| 9,266,301 B2 | 2/2016 | Furman et al. |
| 9,303,977 B2 | 4/2016 | Kellomki et al. |
| 9,388,530 B2 | 7/2016 | Von Drasek et al. |
| 9,404,895 B2 | 8/2016 | Von Drasek et al. |
| 9,675,905 B2 | 6/2017 | Mudaly |
| 9,721,377 B2 | 8/2017 | Raunio et al. |
| 9,801,384 B2 | 10/2017 | Barak |
| 9,851,199 B2 | 12/2017 | Von Drasek et al. |
| 10,043,256 B2 | 8/2018 | Toskala et al. |
| 10,155,662 B2 | 12/2018 | Gatti et al. |
| 10,329,715 B2 | 6/2019 | Buist et al. |
| 10,496,061 B2 | 12/2019 | Strohmenger et al. |
| 10,501,274 B2 | 12/2019 | Ramakrishnan et al. |
| 10,604,896 B2 | 3/2020 | Von Drasek et al. |
| 10,643,323 B2 | 5/2020 | Toskala et al. |
| 10,697,119 B2 | 6/2020 | Kallerdahl et al. |
| 10,844,547 B2 | 11/2020 | Silva et al. |
| 10,914,037 B2 | 2/2021 | Gorden |
| 10,941,522 B1 | 3/2021 | Buist et al. |
| 11,015,293 B2 | 5/2021 | Patterson |
| 11,041,271 B2 | 6/2021 | Luneau et al. |
| 12,228,588 B2 * | 2/2025 | Weiss ..................... G01P 15/18 |
| 2002/0054449 A1 * | 5/2002 | Despain ................. G11B 19/04 |
| 2002/0060017 A1 | 5/2002 | Kuusisto et al. |
| 2005/0145357 A1 * | 7/2005 | Muench ............ G05B 23/0221 |
| | | 162/263 |
| 2006/0143671 A1 | 6/2006 | Ens et al. |
| 2007/0204966 A1 | 9/2007 | Chou et al. |
| 2010/0086672 A1 | 4/2010 | Von Drasek et al. |
| 2010/0269996 A1 | 10/2010 | Grattan et al. |
| 2011/0297341 A1 | 12/2011 | Dilkus |
| 2012/0211190 A1 | 8/2012 | Goto et al. |
| 2013/0048238 A1 | 2/2013 | Glover et al. |
| 2013/0180677 A1 | 7/2013 | Thomas et al. |
| 2013/0245158 A1 | 9/2013 | Grigoriev et al. |
| 2014/0096925 A1 | 4/2014 | Gorden |
| 2014/0110071 A1 | 4/2014 | Furman et al. |
| 2014/0254885 A1 | 9/2014 | Sze |
| 2015/0053358 A1 | 2/2015 | Ban et al. |
| 2015/0159329 A1 | 6/2015 | Tan et al. |
| 2015/0299952 A1 | 10/2015 | Kalaniemi |
| 2016/0032527 A1 | 2/2016 | Gorden |
| 2016/0239755 A1 | 8/2016 | Aggour et al. |
| 2017/0016181 A1 | 1/2017 | Edbauer et al. |
| 2017/0357240 A1 | 12/2017 | Stewart et al. |
| 2018/0144271 A1 | 5/2018 | Schlitt et al. |
| 2018/0284741 A1 * | 10/2018 | Cella .................. G06F 18/2178 |
| 2019/0033850 A1 | 1/2019 | B R et al. |
| 2020/0277734 A1 | 9/2020 | Kallerdahl et al. |

FOREIGN PATENT DOCUMENTS

| | | |
|---|---|---|
| KR | 102222734 B1 | 3/2021 |
| WO | 2013037926 A1 | 3/2013 |
| WO | 2018122857 A1 | 7/2018 |
| WO | 2021137133 A1 | 7/2021 |

* cited by examiner

SYSTEM AND METHOD FOR RETROACTIVE AND AUTOMATED VALIDATION OR CORRECTIVE ACTION WITH RESPECT TO ONLINE SENSORS

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND

Various embodiments of inventions as disclosed herein may relate to systems and methods to proactively alert users regarding needed interventions such as cleaning or replacement, and/or implement automated calibrations, for online sensors for use in industrial processes. Such industrial processes may include, without limitation, chemical processes having multiple stages (e.g., raw input stage, chemical feed stage, output solution stage) any one or more of which include online sensors for real time measurements of respective process components.

In such industrial processes, it is common for associated conditions (environmental or otherwise) to cause or otherwise facilitate disruptions in the sensors' ability to generate accurate measurements, wherein interventions such as cleaning, recalibration, or even replacement may be required. In conventional applications, a skilled technician must be utilized to pull a water or other process sample, test its characteristics and execute a calibration locally on an associated controller. Often, the field conditions are less than ideal for measurement of the parameter of interest. The field technician may or may not be fully trained in performing the test accurately, and in many instances the veracity of measurements may be in doubt due to human error, subjective analysis of online conditions, or even suspicion that the field technician may have "dry-labbed" the analysis.

It would therefore be desirable to validate measurements obtained from online sensors in a reliable manner, and as needed to automatically implement calibration of said sensors, and/or to automatically initiate user interventions, in an objective, precise, and timely fashion.

BRIEF SUMMARY

In view of some or all of the aforementioned issues and objectives, systems and methods as disclosed herein may implement automated calibration and/or intervention prompts with respect to online water and/or other equivalent process sensors. In one particular but non-limiting embodiment, this may involve testing specific parameters offsite, typically a lab, and using software to retroactively improve or validate the accuracy of data being generated. The process may involve a sample of water/process fluid being collected on the same system as the sensor being validated and sent to an offsite location where parameters are tested. This data may be remotely uploaded to the respective controller to implement a one-point calibration in retrospect. If a deviation between the offsite sample and the online sensor reading exceeds an acceptable bound or such a deviation occurs more than an acceptable number of times, a two-point calibration or an intervention (e.g., maintenance such as cleaning, change of probe, change in operating conditions) may be recommended and a notification will be automatically sent to an onsite technician or other authorized personnel.

Briefly stated, in accordance with various embodiments as disclosed herein, the burden of measurement may desirably be shifted from the field to a controlled environment such as a water/deposit lab where the technicians are well trained, the instrumentation is state of the art, and the veracity of the analysis is not in doubt. Since the value of real time measurement at the site using "edge" sensors is known, we can compare this value to the value measured at the lab to find any difference (delta) there between and which can be used to not only do a "one-point calibration" that adjusts the measurement of the edge sensor device in hindsight, it can also be used to generate other insights, such as whether a sensor needs maintenance such as cleaning or replacement.

According to a first exemplary embodiment, a method is disclosed herein for correction of sensors in an industrial process. First data are collected via one or more first sensors, the first data corresponding to measured variables for at least one respective process component. The first data are aggregated in data storage with corresponding contextual tags comprising time series identifiers. For a given sample from the industrial process, the method further includes obtaining at least the first data having a corresponding time series identifier, and collecting second data via one or more second sensors, the second data comprising measured variables corresponding to the at least one respective process component from the given sample. A feedback signal is selectively generated based on a determined error between the collected first data and the collected second data corresponding to the given sample.

In a second embodiment, one exemplary aspect according to the above-referenced first embodiment may include automatically calibrating at least one of the one or more first sensors based on the generated feedback signal.

In a third embodiment, further exemplary aspects according to either of the above-referenced first or second embodiments may include automatically determining an intervention state for at least one of the one or more first sensors based at least in part on the feedback signal and generating a message corresponding to the determined intervention state via a user interface. At least one type of determined intervention state may for example correspond to a message prompting maintenance of the at least one of the one or more first sensors. At least one type of determined intervention state may for example correspond to a message prompting replacement of the at least one of the one or more first sensors.

In a fourth embodiment, further exemplary aspects according to the above-referenced third embodiment may include that the intervention state is determined based on predictive analysis with respect to an error condition. The intervention state may for example be further determined in view of a margin for error and utilizing observed trends corresponding to the aggregated first data. The margin for error may further for example be dynamically determined based on the observed trends corresponding to the aggregated first data.

In a fifth embodiment, further exemplary aspects according to any of the above-referenced first to fourth embodiments may include adjusting the aggregated first data based on the feedback signal to retroactively account for the determined error, further in view of the corresponding time series identifier.

In a sixth embodiment, further exemplary aspects according to any of the above-referenced first to fifth embodiments may include that at least the determined error is implemented for development and/or training of a model to reflect learned relationships between the first data and one or more process conditions and/or quality metrics.

In a seventh embodiment, further exemplary aspects according to any of the above-referenced first to sixth embodiments may include that the one or more first sensors are mounted online for real-time measurements with respect to the industrial process, and the one or more second sensors are offline with respect to the industrial process.

In an eighth embodiment, further exemplary aspects according to any of the above-referenced first to sixth embodiments may include that the one or more first sensors are mounted at a first online location to generate first data for the given sample with a first time series identifier, and the one or more second sensors are mounted at a second online location to generate second data for the given sample with a second time series identifier.

In a ninth embodiment, further exemplary aspects according to any of the above-referenced first to sixth embodiments may include that the one or more first sensors are mounted at a first online location to generate first data for the given sample with a first time series identifier, the one or more second sensors are mounted at a second online location to generate data for the given sample with a second time series identifier, and the data generated by the one or more second sensors are processed to indirectly determine the second data corresponding to the at least one respective process component.

In a tenth embodiment, a system as disclosed herein includes one or more first sensors mounted online with respect to an industrial process, and configured to generate first data corresponding to measured variables in real time for at least one respective process component. Data storage aggregates the first data with corresponding contextual tags comprising time series identifiers. A data processor is further provided and configured, alone or further in combination with one or more controllers associated with the one or more first sensors, to direct the performance of steps according to any of the above-referenced first to ninth embodiments.

Numerous objects, features and advantages of the embodiments set forth herein will be readily apparent to those skilled in the art upon reading of the following disclosure when taken in conjunction with the accompanying drawings.

DETAILED DESCRIPTION

Figure 1:
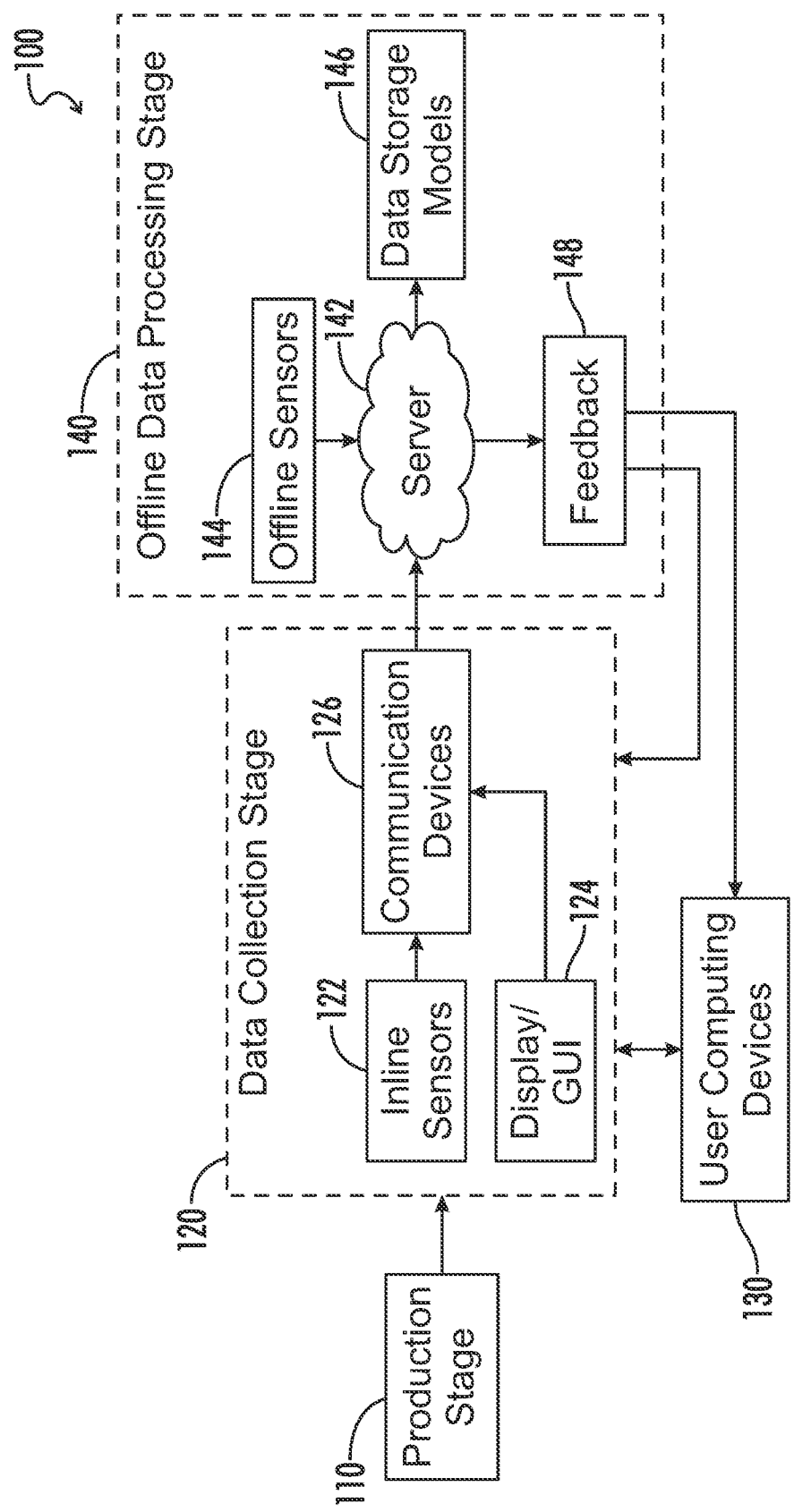
FIG. 1 is a block diagram representing an exemplary embodiment of a system as disclosed herein.

Referring generally to FIGS. 1 and/or 2, various exemplary embodiments of an invention may now be described in detail. Where the various figures may describe embodiments sharing various common elements and features with other embodiments, similar elements and features are given the same reference numerals and redundant description thereof may be omitted below.

Briefly stated, systems and methods as disclosed herein may be implemented to proactively alert users or implement automated sensor calibration in industrial (e.g., chemical) processes, using for example remote sensors and/or comparative data analytics with respect to analogous process component samples.

Referring initially to FIG. 1, an embodiment of a hosted system 100 as disclosed herein may be provided in association with, or even in some cases include, various stages in an industrial plant including a production stage 110 and a data collection stage 120, as well as an offline (typically but not necessarily remote with respect to the industrial plant) data processing stage 140. The data collection stage 120 as disclosed herein includes at least online sensors 122 with respect to one or more components of an industrial process, output signals from which are provided (directly or indirectly) to the offline data processing stage 140 for analysis via a data processor (e.g., a hosted server 142 as further described herein). In some embodiments as further described below, the offline data processing stage 140 may include offline sensors 144 for generating comparative data with respect to data collected from online sensors 122, but in other embodiments all of the data collected and analyzed within the scope of a given sample from the industrial process may be provided via different sets of online sensors 122. The offline data processing stage 140 may be remote and associated with a third party host entity, or may be associated with the industrial plant itself within the scope of the present disclosure, but in either context may typically be configured to provide feedback signals or data 148 to the data collection stage 120 (and more particularly to local controllers associated with one or more of the online sensors 122) and/or to user computing devices 130.

The term "industrial plant" as used herein may generally connote a facility for production of goods, independently or as part of a group of such facilities, via an industrial process and may for example but without limitation involve a chemical business, a manufacturing industry, food and beverage industry, agricultural industry, swimming pool industry, home automation industry, leather treatment industry, paper making process, or the like. A "production stage" 110 in such an industrial plant may include numerous respective stages. For example, an exemplary industrial process may include one or more input stages arranged to provide respective streams of content to a chemical feed stage which further provides an output solution. An online sensor or set of online sensors as disclosed herein may accordingly be arranged to provide measurements for process components associated with any one or more sub-stages within a production stage depending for example on the type of process.

The term "sensors" 122 may include, without limitation, physical level sensors, relays, and equivalent monitoring devices as may be provided to directly measure values or variables for associated process components or elements, or to measure appropriate derivative values from which the process components or elements may be measured or calculated. Some or all of the sensors as disclosed herein may preferably be configured to, substantially continuously, generate signals corresponding to real-time values for conditions and/or states of the respective components. The sensors may be configured to calibrate or otherwise transform raw measurement signals into output data in a form or protocol to be processed by downstream computing devices, or in various embodiments one or more controllers or equivalent intervening computing devices may be implemented to receive raw signals from some or all of the sensors and provide any requisite calibration or transformation into a desired output data format. Unless otherwise noted herein, the term "sensor" may refer to a device including each of the measurement, data conversion, and calibration functions without requiring that each such function and associated hardware and/or software are provided within a collective housing, or in other words that the functions may be performed in a centralized or distributed fashion within the scope of the present disclosure.

The terms "online" or "inline" as may be used herein generally refer to the use of a device, sensor, or corresponding elements proximally located to a container, machine, or associated process elements, and generating output signals substantially in real time corresponding to the respective process elements, as distinguished from manual or automated sample collection and remote "offline" analysis in a laboratory or an equivalent lacking for example the detrimental environmental conditions of the industrial process itself.

Individual sensors 122 may be separately mounted and configured, or the system 100 may provide a modular housing which includes, e.g., a plurality of sensors or sensing elements. Sensors or sensor elements may be mounted permanently or portably in a particular location respective to, e.g., a production stage or may be dynamically adjustable in position so as to collect data from a plurality of locations during operation.

Online sensors 122 as disclosed herein may provide substantially continuous measurements with respect to various process components and elements, and substantially in real-time. The terms "continuous" and "real-time" as used herein, at least with respect to the disclosed sensor outputs, does not require an explicit degree of continuity, but rather may generally describe a series of measurements corresponding to physical and technological capabilities of the sensors, the physical and technological capabilities of the transmission media, the physical and technological capabilities of any intervening local controller, communications device, and/or interface configured to receive the sensor output signals, etc. For example, measurements may be taken and provided periodically and at a rate slower than the maximum possible rate based on the relevant hardware components or based on a communications network configuration which smooths out input values over time, and still be considered "continuous."

One or more additional online sensors 122 may be configured to provide substantially continuous measurements with respect to machine operating parameters. A graphical user interface (GUI) 124 may be further provided and configured to enable operator input regarding additional parameters and/or coefficients as further described below. The user interface 124 may further enable users such as operators, administrators, and the like to provide periodic input with respect to conditions or states of additional components of relevance to downstream algorithms as further discussed herein. The user interface 124 may be in functional communication with a hosted server 142 and/or local process control units (not shown), directly or for example via local communications devices 126 as further described below, to receive and display process-related information, or to provide other forms of feedback with respect to, e.g., control processes as further discussed herein. The term "user interface" 124 as used herein may unless otherwise stated include any input-output module with respect to a local controller and/or a hosted data server 142, including but not limited to: a stationary operator panel with keyed data entry, touch screen, buttons, dials, or the like; web portals, such as individual web pages or those collectively defining a hosted website; mobile device applications; and the like. As described herein, the term "controller" may be used to refer to a local controller specific to one or more online sensors, or more generally to a process controller associated with the production stage 110 and which may even include the hosted data server 142, but it is noted that unless otherwise stated for a given embodiment the process control functions may be implemented via a local or external computing device/network without limitation.

Accordingly, one example of the user interface 124 may be as generated remotely on a user computing device 130 and communicatively linked to the remote server 142. Alternatively, an example of the user interface 124 may within the scope of the present disclosure be generated on a stationary display unit in an operator control panel (not shown) associated with a production stage 110 of an industrial plant.

The data collection stage 120 may further include one or more communications devices 126 configured to receive output signals from the online sensors 122 and to transmit corresponding output data to an offline data processing stage 140 including a hosted server 142 via, e.g., a communications network. A communications device 126 may be stand-alone or alternatively be comprised of a local controller (not shown) configured for example to direct the collection and transmittal of data from the industrial plant to the cloud server 142, and further to direct output signals from the server 142 to other process controllers at the plant level or more directly to process actuators in the form of control signals to implement automated interventions. In some embodiments the communications device 126 or local controller may be omitted, where for example data collection tools are distributed to directly transmit data streams via the communications network, and a user computing device which also displays and implements the GUI 124 is implemented to receive the output signals from the server 142, etc. In some embodiments as previously noted, the communications device 126 or local controller may be comprised of at least part of an industrial plant's resident control system.

In an embodiment, a conversion stage (not shown) may be added for the purpose of converting raw signals from one or more of the online sensors 122 to a signal compatible with data transmission or data processing protocols of the communications network and/or cloud server-based storage 146 and applications. A conversion stage may relate not only to input requirements but also may further be provided for data security between one or more online sensors 122 and the cloud-based server 142, or between local communications devices such as a local controller and the server 142. The conversion stage may further convert raw signals from one or more of the online sensors 122 to a signal compatible with the input requirements of a local controller or downstream algorithm.

The term "communications network" as used herein with respect to data communication between two or more system components or otherwise between communications network interfaces associated with two or more system components may refer to any one of, or a combination of any two or more of, telecommunications networks (whether wired, wireless, cellular or the like), a global network such as the Internet, local networks, network links, Internet Service Providers (ISP's), and intermediate communication interfaces. Any one or more conventionally recognized interface standards may be implemented therewith, including but not limited to Bluetooth, RF, Ethernet, and the like.

The offline data processing stage 140 as represented in FIG. 1 and referenced above may be provided with a hosted server 142 or network of hosted servers. The hosted server 142, which may be associated with a third party to the industrial plant or alternatively may be a server associated with the industrial plant or an administrator thereof, further may include or be linked to a data storage device or network 146 including models and/or algorithms relating to a process state and/or intervention event for, e.g., components or aspects of the production stage 110. A cloud-based server 142 implementation may accordingly be configured to process data provided from the industrial plant, in view of iteratively developed models residing in the data storage network 146, and to generate feedback 148 to respective devices or user interfaces in or otherwise associated with the industrial plant.

One of skill in the art may appreciate that offline sensors 144 in the offline data processing stage 140 as illustrated in FIG. 1 may typically be more precise than online counterparts, at least in view of the relative lack of environmental issues and lower risk of damage over time which may enable more investment in the structure, among other factors. However, it may be contemplated within the scope of the present disclosure that identical types of sensors are utilized in both of the online sensor 122 and offline sensor 144 contexts with respect to analogous process components being measured.

The above-referenced system 100 may be implemented in an embodiment of a method 200 as further discussed below with illustrative reference to FIG. 2. Automated calibration or other intervention notice or control functions associated with the methods may be described herein as being provided by, or otherwise implemented using, an offline data processing stage 140 as shown in FIG. 1 and which may include a hosted cloud server 142, but various alternative embodiments including local or other controllers, as well as alternative and equivalent examples of algorithms or models, are contemplated within the scope of the present disclosure and the examples provided are non-limiting unless otherwise specifically noted. Depending on the embodiment, certain acts, events, or functions of any of the algorithms described herein can be performed in a different sequence, can be added, merged, or left out altogether (e.g., not all described acts or events are necessary for the practice of the algorithm) Moreover, in certain embodiments, acts or events can be performed concurrently, e.g., through multi-threaded processing, interrupt processing, or multiple processors or processor cores or on other parallel architectures, rather than sequentially.

Figure 2:
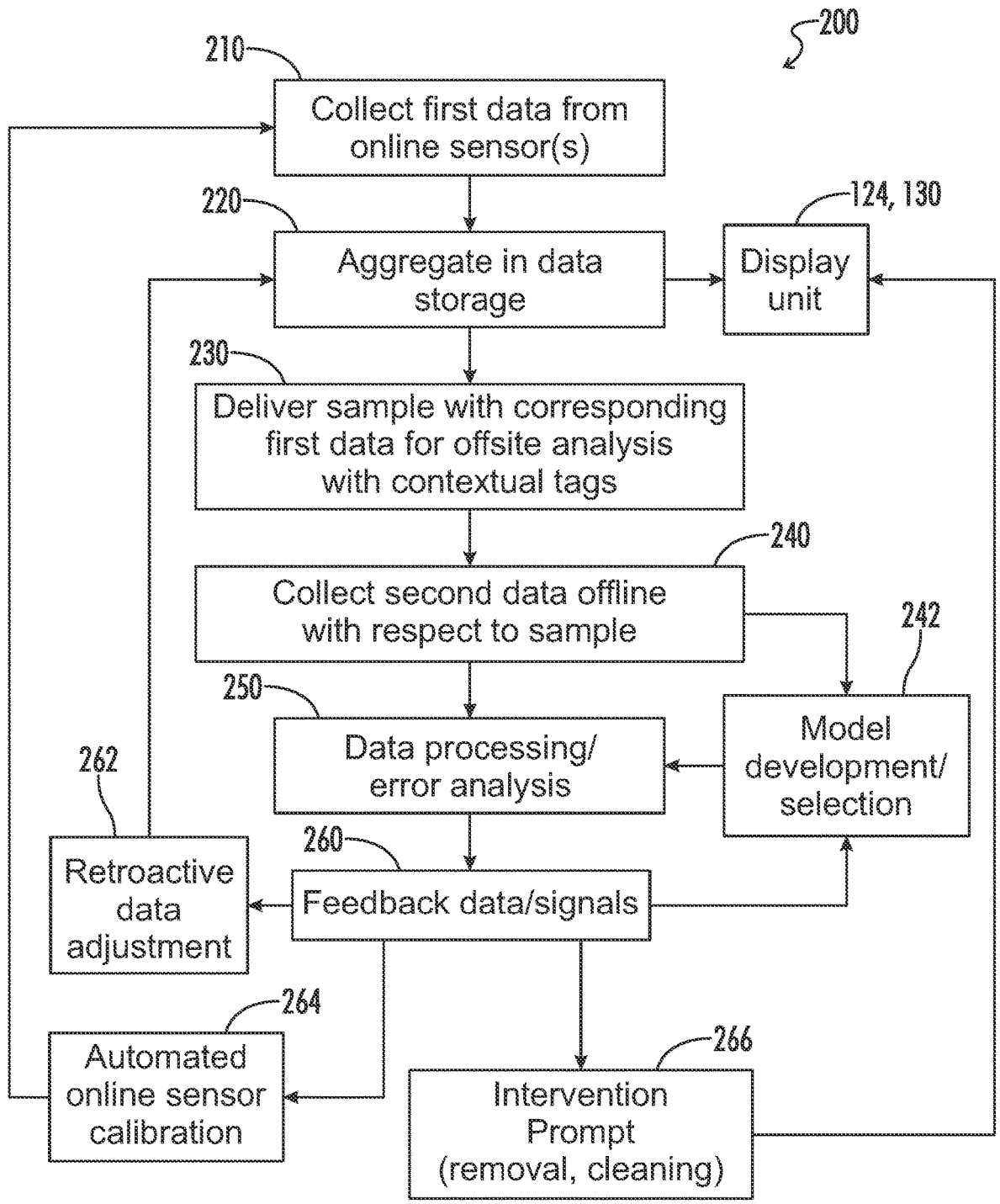
FIG. 2 is a diagram and simplified flowchart representing an exemplary embodiment of a method as disclosed herein.

As represented in a first step 210 according to the method 200 of FIG. 2, data collection stage 120 may include at least a first online sensor 122 to directly measure, sense, or otherwise obtain signals or values corresponding to one or more process components, wherein these signals or values are collected as or otherwise transformed to first data. Various (non-limiting) examples of process components being measured may include an amount of a certain chemical in a solution, a pH value, water conductivity, etc., or more generally to inputs or outputs relating to specified unit operations (e.g., cooling towers, heat exchangers, boilers, Brown stock washers), simple assets (e.g., chemical tanks, storage facilities), process streams (e.g., interconnecting channels between other elements of water, energy, material such as fiber), or the like as may be understood by one of skill in the art with respect to any specified industrial process.

The outputs (first data) from the data collection stage 120 are transmitted via a communications network to an offline data processing stage 140 which may include a remote (e.g., cloud-based) server network 142. The sets of first data are aggregated in data storage 146 alongside or otherwise associated with contextual tags which may typically include time series identifiers. Optional further examples of contextual tags may include identifiers for a product being manufactured, a location of the industrial plant and/or state associated with the sample being drawn, ambient conditions such as temperature or humidity, or other process component measurements from online sensors at different locations. One or more contextual tags may be generated remotely via information retrieved in association with a sample collected from the production stage 110, such as for example where a QR code or equivalent machine-readable identifier is scanned at the site of the sampling point and delivered to the offline data processing stage 140, wherein certain tags may be retrieved from data storage 146 in association with the sampling point, first sensor, production stage 110, industrial plant, or the like. The aggregation of data may typically include chronological arrangement of the input data points for subsequent retrieval as further described below for comparative analytics and/or trend analysis.

Referring again to the embodiment of a method 200 according to FIG. 2, a sample from the process such as for example a water sample may be collected and delivered for offsite analysis (step 230), wherein the sample is associated with measurements from the first data based at least in part on the corresponding time series identifier. At least a second sensor 144 is provided offline, for example in a lab with an optimal environment for precise measurements of the process components having been measured by the first sensor 122, and such measurements are collected via the second sensor with respect to the provided sample (step 240).

Data processing (step 250) may then be performed, for example to identify an error as a difference between the "first data" measurements and the "second data" measurements for the corresponding process components, with the expectation being that the second data is more precisely captured and therefore represents correct values for the respective process components. In some contexts, values according to the first data may be adjusted to expected data values based on for example a known tendency for the process component being measured over time, further based on the amount of time since the sample was collected or other relevant environmental factors, etc., such that the second data are compared against the expected data values derived from the first data.

In certain embodiments, the first data may still be obtained via one or more first online sensors, whereas the second data are instead obtained via one or more second online sensors. Such embodiments may be applicable for cases where many online sensors are utilized to determine the true value of a process component that cannot be adequately measured in an offline lab environment. In one example, the second online sensors may directly measure the same process components as the first online sensors but in different locations. In another example, the second online sensors may directly measure different process components with respect to the first online sensors, but the process components measured by the second online sensors may individually or collectively correlate to the process components measured by the first online sensors such that expected data values for the first data may be derived from the second data. Such expected data values may be derived in part from contextual information associated with the first data, from other conditions detected in association with the first data and/or second data, predictive analytics based on learned correlations over time and implemented via selected models from data storage, etc.

In initial iterations of the method, at least in embodiments utilizing predictive analytics, a first server 142 may for example further transmit the outputs from the data collection stage 120 (i.e., first data and/or second data depending on the embodiment) of the industrial plant to a separate server and/or data storage network 146 for iterative development and updating of predictive models associated with the present disclosure (step 242). Initial models may for example be constructed based on data collected and optionally aggregated from multiple production stages (e.g., chemical feed skids and other downstream production stage components) distributed across any number of industrial locations. Once the models have been sufficiently developed, subsequent inputs from the data collection stage 120 of a given industrial plant may be processed for predictive analysis.

Upon determining an error value associated with the collected sample, feedback signals may be provided from, e.g., the hosted server 142 for utilization in any number of features as follows (step 260).

In one example, feedback signals and/or data may be provided to retroactively adjust the aggregated first data values in data storage based on the determined error value (step 262). Such adjustments may be provided from at least the time that the sample was collected from the production stage based on the corresponding time series identifier, wherein each previously stored first data value is adjusted to account for the determined error value. In certain embodiments, various aggregated first data entries prior to the sample collection time in the data storage may also be flagged as being unreliable, where for example they were collected after a previous data validation step and/or where the determined error value is sufficiently cautionary.

In another example, feedback signals and/or data may be provided for automated calibration of at least one of the first set of sensors based on the determined error value (step 264). In certain embodiments, the feedback data may be provided to a local controller in the form of an error value, wherein the local controller is configured to determine the appropriate steps for recalibrating the first sensor or otherwise altering subsequent conversions made to signals received from the first sensor. In other embodiments, the feedback data may be provided in the form of a configuration file for directly loading into the controller or the first sensor and implementing the calibration. The automated calibration may in some embodiments be made conditional on a manual approval, which may be obtained in the form of user input with respect to a prompt sent to a user interface via an automated message system. In some embodiments, the feedback may only be conditionally provided for automated calibration based on a determined error state, such as the determined error value being outside of a specified range of permissible error values, based on a trend in determined error values for a given first sensor indicating that calibration is desired as opposed to intervention as further described below, etc.

In another example, feedback data may be provided for automated intervention prompts to one or more authorized users via respective display units (step 266). The automated intervention prompts may take the form of alerts for maintenance such as removal or cleaning of at least one of the first sensors based at least in part on the determined error value. In various embodiments a method 200 as disclosed herein may distinguish between a programmed calibration and a programmed prompt for manual intervention (such as removal or cleaning) based on trends in historical data associated with the particular first sensor. For example, the server may be configured to distinguish between a first directional pattern corresponding to gradual drift in measurements from the first sensor relative to (and consistently away from) the measurements from the second sensor, a second directional pattern wherein the measurements from the first sensor are inconsistently higher or lower than measurements from the second sensor, a third directional pattern wherein the determined error value leaps from a first series of error values within a tight range to a second error value or series of error values within a different tight range, etc.

Various embodiments of the models as disclosed herein may be deployed by the cloud server 142 to provide alerts to users to prompt them to manually inspect and regulate certain sensors or other components as needed, as opposed to the manual interventions previously noted. The users may then be automatically prompted to provide feedback on the accuracy of the models, which would preferably be used to fine tune the models. In an embodiment, upon system prediction of an intervention event, a message may be generated to a user interface associated with an operator, administrator, representative, or the like for confirmation or approval to initiate automated regulation of an associated component in the production stage 110. Such approval may for example be received via user actuation of a dedicated button or other interface tool. Alternatively, and as otherwise noted in the present disclosure, an automated calibration or other intervention procedure may be implemented dynamically upon determination of an intervention event, and without manual involvement.

In various embodiments, implementing directly monitored values from the data collection stage 120 of the industrial plant, further in view of the models residing in the data storage network 146, the necessity for automated calibration and/or intervention at a given time may be indirectly predicted and/or determined based on one or more quality characteristics of a product being manufactured. If trends in error values indicate for example that a failure to implement recalibration and/or intervention with respect to the at least one first sensor is predicted as negatively impacting a quality of the product/process (e.g., by comparing the quality characteristics with a received or determined quality target), the method may conditionally proceed by providing feedback signals 148 to the industrial plant for actuating or triggering an automated calibration, and/or prompting a user for manual intervention.

As previously noted, certain embodiments of a method as disclosed herein may be fully automatic in implementation, without requiring or prompting human intervention via, e.g., the graphical user interface 124. The method may otherwise be selectively implemented for one or more intermediate steps wherein operators or other authorized personnel can approve or modify certain control adjustments. For example, a cloud server 142 and/or local controller may be configured to determine an amount that either a recalibration, cleaning, or removal is required with respect to the at least one first sensor, and further generate a notification of the same to a designated user interface 124, 130 such as an operator dashboard, mobile app on a phone, etc. The authorized personnel may accordingly be prompted to choose and enact the proposed interventions manually, or to provide feedback, via for example approval or edits to the recommended adjustment, wherein the server/controller resumes automated calibration of the at least one first sensor based thereon.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may. As used herein, the phrase "one or more of," when used with a list of items, means that different combinations of one or more of the items may be used and only one of each item in the list may be needed. For example, "one or more of" item A, item B, and item C may include, for example, without limitation, item A or item A and item B. This example also may include item A, item B, and item C, or item B and item C.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable medium known in the art. An exemplary computer-readable medium can be coupled to the processor such that the processor can read information from, and write information to, the memory/storage medium. In the alternative, the medium can be integral to the processor. The processor and the medium can reside in an ASIC. The ASIC can reside in a user terminal. In the alternative, the processor and the medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A method for correction of sensors in an industrial process, the method comprising:
    collecting first data via one or more online first sensors with respect to the industrial process, the first data corresponding to measured variables for at least one respective process component;
    aggregating the first data in data storage as respective input data points with corresponding contextual tags comprising time series identifiers;
    for a given sample collected from a production stage of the industrial process and having a respective time series identifier, obtaining at least one respective input data point of the first data having a corresponding time series identifier;
    collecting second data via one or more second sensors, the second data comprising measured variables corresponding to the at least one respective process component from the given sample;
    determining a difference between at least one measured variable from the first data and the corresponding at least one measured variable from the second data;
    selectively generating a feedback signal to at least one of the one or more first sensors as an error value based on the determined difference; and
    automatically calibrating the at least one of the one or more first sensors to correct further first data collected from the at least one of the one or more first sensors based on the generated feedback signal.

2. The method of claim 1, further comprising:
    automatically determining an intervention state for at least one of the one or more first sensors based at least in part on the feedback signal and generating a message corresponding to the determined intervention state via a user interface.

3. The method of claim 2, wherein at least one type of determined intervention state corresponds to a message prompting maintenance of the at least one of the one or more first sensors.

4. The method of claim 2, wherein at least one type of determined intervention state corresponds to a message prompting replacement of the at least one of the one or more first sensors.

5. The method of claim 2, wherein the intervention state is determined based on predictive analysis with respect to an error condition.

6. The method of claim 5, wherein the intervention state is further determined in view of a margin for error and utilizing observed trends corresponding to the aggregated first data.

7. The method of claim 6, wherein the margin for error is dynamically determined based on the observed trends corresponding to the aggregated first data.

8. The method of claim 1, further comprising:
adjusting the aggregated first data based on the feedback signal to retroactively account for the determined error value, further in view of the corresponding time series identifier.

9. The method of claim 1, wherein at least the determined error value is implemented for development and/or training of a model to reflect learned relationships between the first data and one or more process conditions and/or quality metrics.

10. The method of claim 1, wherein the one or more second sensors are offline with respect to the industrial process.

11. The method of claim 1, wherein the one or more first sensors are mounted at a first online location to generate first data for the given sample with a first time series identifier, and the one or more second sensors are mounted at a second online location to generate second data for the given sample with a second time series identifier.

12. The method of claim 1, wherein the one or more first sensors are mounted at a first online location to generate first data for the given sample with a first time series identifier, the one or more second sensors are mounted at a second online location to generate data for the given sample with a second time series identifier, and the data generated by the one or more second sensors are processed to indirectly determine the second data corresponding to the at least one respective process component.

13. A system comprising:
one or more first sensors mounted online with respect to an industrial process, and configured to generate first data corresponding to measured variables in real time for at least one respective process component;
data storage aggregating the first data as respective input data points with corresponding contextual tags comprising time series identifiers; and
a data processor configured, for a given sample collected from a production stage of the industrial process and having a respective time series identifier, to
obtain at least the respective input data point of the first data having a corresponding time series identifier,
collect second data via one or more second sensors, the second data comprising measured variables corresponding to the at least one respective process component from the given sample,
determine a difference between at least one measured variable from the first data and the corresponding at least one measured variable from the second data, and
selectively generate a feedback signal to at least one of the one or more first sensors as an error value based on the determined difference;
wherein a controller is functionally linked to the at least one of the one or more first sensors and configured to automatically correct further first data generated from the at least one of the one or more first sensors based on the generated feedback signal.

14. The system of claim 13, wherein the processor is further configured to adjust the aggregated first data based on the feedback signal to retroactively account for the determined error value, further in view of the corresponding time series identifier.

15. The system of claim 13, wherein the processor is further configured to implement at least the determined error value for development and/or training of a model to reflect learned relationships between the first data and one or more process conditions and/or quality metrics.

16. The system of claim 13, wherein the one or more second sensors are offline with respect to the industrial process.

17. The system of claim 13, wherein the one or more first sensors are mounted at a first online location to generate first data for the given sample with a first time series identifier, and the one or more second sensors are mounted at a second online location to generate second data for the given sample with a second time series identifier.

18. The system of claim 13, wherein the one or more first sensors are mounted at a first online location to generate first data for the given sample with a first time series identifier, the one or more second sensors are mounted at a second online location to generate data for the given sample with a second time series identifier, and the data generated by the one or more second sensors are processed to indirectly determine the second data corresponding to the at least one respective process component.

* * * * *